United States Patent
Hobbs

(10) Patent No.: US 6,579,041 B2
(45) Date of Patent: Jun. 17, 2003

(54) PRE-SCREENING ELEMENT FOR PNEUMATIC PARTICLE TRANSPORT SYSTEMS

(76) Inventor: George Hobbs, 131 Bock St., New Dundee, Ontario (CA), N0B 2E0

( * ) Notice: Subject to any disclaimer, the term of this patent is extended or adjusted under 35 U.S.C. 154(b) by 166 days.

(21) Appl. No.: 09/785,647

(22) Filed: Feb. 20, 2001

(65) Prior Publication Data

US 2002/0114673 A1 Aug. 22, 2002

(51) Int. Cl.$^7$ .............................................. B65G 53/40
(52) U.S. Cl. ......................... 406/121; 138/42; 241/40; 432/61; 209/22
(58) Field of Search ........................... 432/61; 406/121, 406/171, 89, 90, 192, 191, 157, 163, 86; 209/22; 141/382; 138/41, 43, 42; 241/46.017, 40, 43, 49, 51, 274, 5; 83/100

(56) References Cited

U.S. PATENT DOCUMENTS

| | | | |
|---|---|---|---|
| 1,303,529 A | * 5/1919 | York ............................ 137/539 |
| 1,403,399 A | * 1/1922 | Frist ............................. 241/40 |
| 1,404,652 A | * 1/1922 | Rohnow ........................ 138/41 |
| 2,128,848 A | * 8/1938 | Rafetto ......................... 209/638 |
| 2,841,446 A | * 7/1958 | Trotter ......................... 406/108 |
| 3,075,559 A | * 1/1963 | Sharp et al. ................... 138/37 |
| 3,087,482 A | * 4/1963 | Haller .......................... 125/24 |
| 3,406,947 A | * 10/1968 | Harder .......................... 138/42 |
| 3,460,580 A | * 8/1969 | Carter .......................... 138/42 |
| 4,062,524 A | * 12/1977 | Brauner et al. ................ 138/37 |
| 4,269,548 A | 5/1981 | von Bennigsen-Mackiewicz et al. |
| 4,445,533 A | 5/1984 | DeFrees |
| 4,466,741 A | * 8/1984 | Kojima ......................... 138/37 |
| 4,860,783 A | * 8/1989 | Megee et al. ................. 137/268 |
| 5,184,641 A | * 2/1993 | Kuhn ........................... 137/504 |
| 5,378,063 A | * 1/1995 | Tsukada ....................... 366/337 |
| 6,089,795 A | 7/2000 | Booth |
| 6,224,833 B1 | * 5/2001 | Rall ............................. 422/139 |

* cited by examiner

Primary Examiner—Christopher P. Ellis
Assistant Examiner—Richard Ridley

(57) ABSTRACT

A pre-screening element for use with pneumatic discharge systems for transport of powdered material has a housing having an inlet and an outlet, a first vane array, having a plurality of strip-shaped first vanes arranged inside the housing and spaced apart with respect to a longitudinal axis of the housing, each individual vane of the plurality of first vanes being substantially parallel to other vanes of the first vane array and having a long edge facing the inlet, and a second vane array, having a plurality of strip-shaped second vanes arranged inside the housing each individual vane of the plurality of second vanes being substantially parallel to other vanes of the second vane array and having a long edge facing the inlet, a longitudinal axis of the first vanes being arranged at an angle to a longitudinal axis of the second vanes.

8 Claims, 3 Drawing Sheets

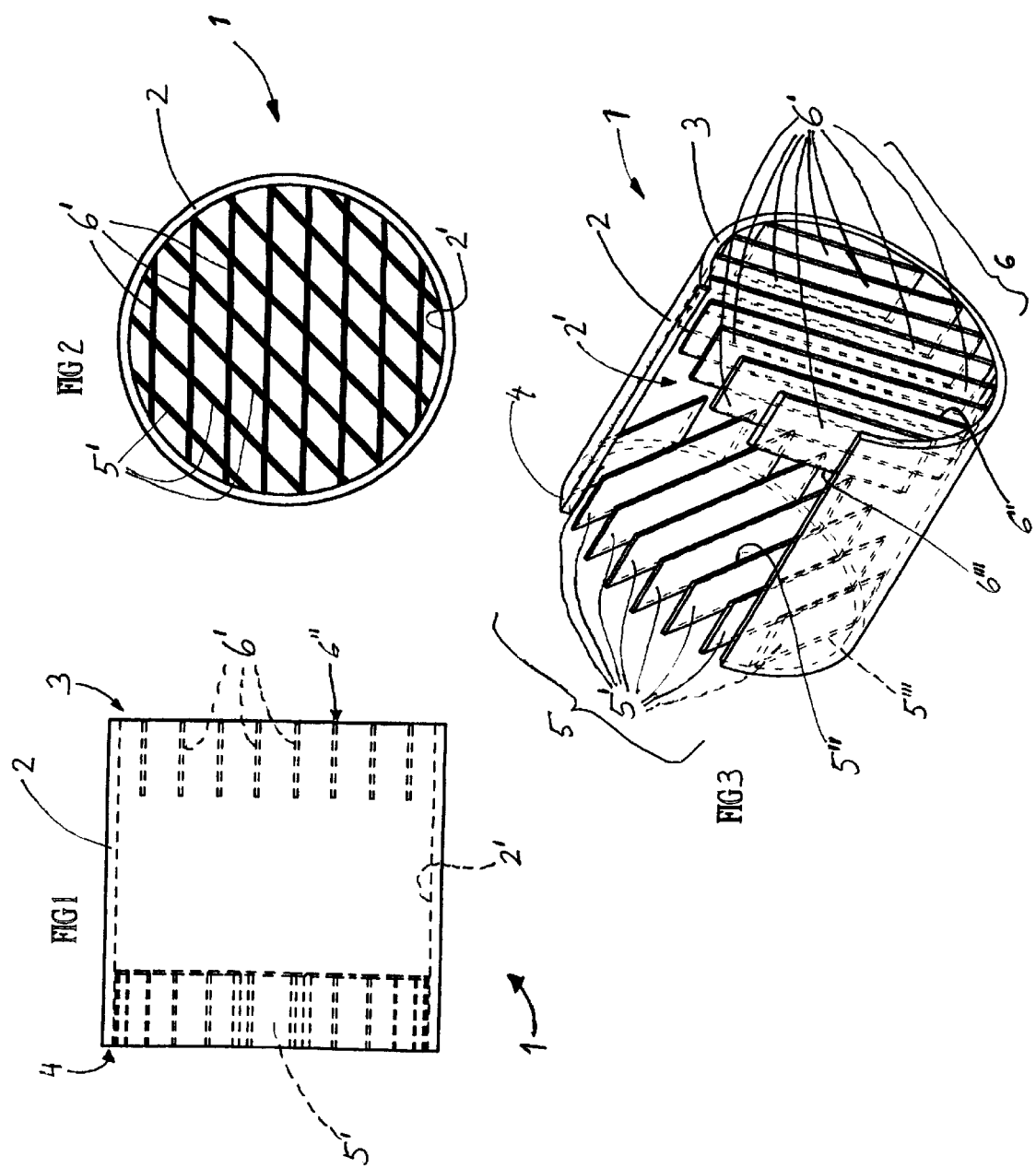

PRE-SCREENING ELEMENT FOR PNEUMATIC PARTICLE TRANSPORT SYSTEMS

BACKGROUND OF THE INVENTION

1. Field of the Invention

The present invention relates to pneumatic particle transport systems, for example systems used to discharge particulate material from transport vehicles to a storage facility, and more particularly to a pre-screening element for such systems.

2. Description of the Prior Art

Historically, pneumatic transport systems have been used to empty transport tanks filled with particulate material, such as flour, sugar, plastic pellets or other fine material, into larger storage containers. A screening filter is traditionally used to filter the material before it enters the storage container. The particulate material will tend to clump together when the relative humidity of the ambient air is high enough, so called "choking", making the discharge operation difficult with frequent stops to clean the discharge hoses and other equipment. Frequently, the operator bangs on the discharge equipment, such as hoses and hoppers, with a rubber hammer to facilitate the flow of material.

DISCLOSURE OF THE INVENTION

It is an object of the invention to provide a pre-screening element which breaks up lumps in the particulate material so that there is little or no clogging of the hoses, nozzles, couplings or filter screens of the discharge system due to lumping of material due to moisture or similar.

Another object of the invention is to provide a pre-screening adapter, utilizing the pre-screening element of the invention, attachable to a discharge coupling on a transport vehicle at one end of the adapter and to a discharge hose at the other end of the adapter. Alternatively, the adapter is attachable to the discharge hose at one end of the adapter and to an inlet coupling of a storage tank at the other end of the adapter.

Still a further object of the invention is to provide a discharge system for handling powdered solids comprising a transport container, a pneumatic discharge system having a fan/blower connected to said container via a first duct and a discharge duct connected to said transport container and a pre-screening adapter according to the invention.

In the invention, a pre-screening element for use with pneumatic discharge systems for transport of powdered material comprises a housing having an inlet and an outlet;

a first vane array, having a plurality of strip-shaped first vanes arranged inside the housing and spaced apart with respect to a longitudinal axis of the housing, each individual vane of the plurality of first vanes being substantially parallel to other vanes of the first vane array and having a long edge facing the inlet;

a second vane array, having a plurality of strip-shaped second vanes arranged inside the housing and spaced apart with respect to a longitudinal axis of the housing, each individual vane of the plurality of second vanes being substantially parallel to other vanes of the second vane array and having a long edge facing the inlet, a longitudinal axis of the first vanes being arranged at an angle to a longitudinal axis of the second vanes.

The angle is preferably between 5 and 90 degrees, most preferably 45 degrees.

Preferably, the housing is generally cylindrical.

The plurality of first vanes are advantageously arranged in a common plane generally perpendicular to the longitudinal axis of the housing. The plurality of second vanes are similarly also advantageously arranged in a common plane generally perpendicular to the longitudinal axis of the housing.

A pre-screening adapter, according to the invention, comprises a length of pipe having a male coupling attached at a first end and a female coupling attached at a second end, and a pre-screening element arranged inside the pipe, the element being as defined above.

A discharge system, according to the invention, comprises a transport container mounted on a vehicle, a pneumatic discharge system having a fan connected to the container via a first duct and a discharge duct connected to the transport container for discharging material pressurized in the transport container by the fan, and a pre-screening adapter as defined above.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 1 is a schematic side view of a pre-screen element according to the invention;

FIG. 2 is a schematic end view of the pre-screen element of FIG. 1;

FIG. 3 is a partly sectioned elevational perspective view of the pre-screen element of FIG. 1;

DETAILED DESCRIPTION OF THE INVENTION

Figure 4:
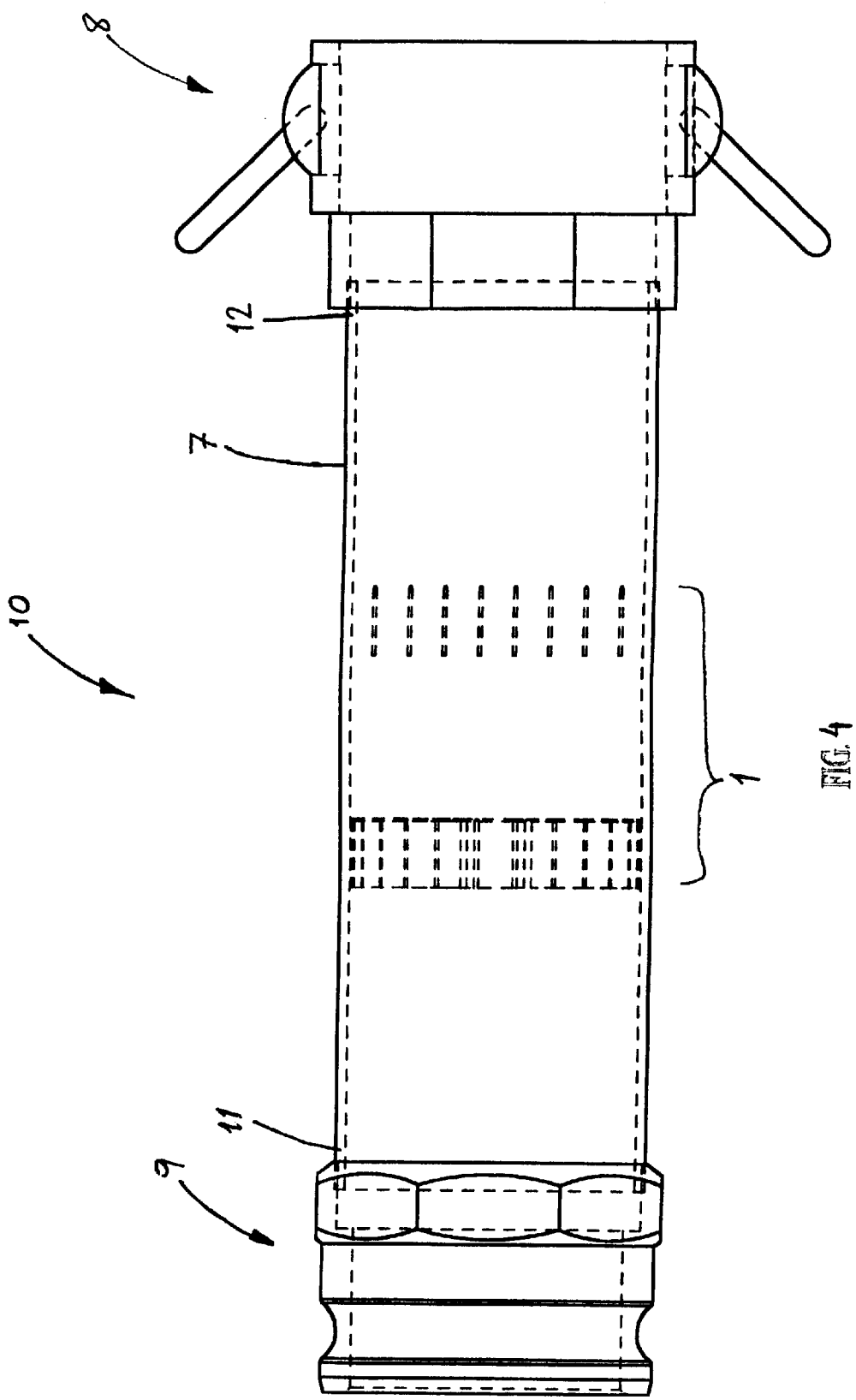
FIG. 4 is a schematic side view of an adapter having a pre-screen element according to the invention.

In FIGS. 1 to 3, a pre-screening element 1 is shown, which breaks up lumps in particulate material flowing through the element so that there is little or no clogging of the hoses, nozzles, couplings or filter screens of a discharge system in which the element is used due to lumping of material due to moisture or similar. Examples of particulate material is flour, sugar, plastic pellets or other fine material that is transported and discharged using a pneumatic system.

The element has a housing 2 having an inner surface 2', an inlet 3 and an outlet 4.

Adjacent the inlet is a first vane array 6, having a plurality of strip-shaped first vanes 6' arranged inside the housing 2 and spaced apart with respect to a longitudinal axis of the housing, each individual vane of the plurality of first vanes being substantially parallel to other vanes of the first vane array and having a long edge 6" facing the inlet. Advantageously, the long edge facing the inlet is sharpened. More advantageously, also an opposite long edge 6'" is sharpened, to provide breaking up of material also if the flow of material changes direction, for example when back-flushing the system when cleaning a particularly big or difficult lump of material. Each first vane 6' is attached to the inside surface 2' of the housing at its ends, preferably by welding but any alternative technique which provides sufficient adhesion may be used, for example brazing or glueing. Each first vane thus has a length that allows it to run from one side of the inner surface of the housing to another side. In the case of a substantially circular housing (as is shown in the FIGS.), there is one first vane of preferably the same length as the inner diameter of the housing arranged in the middle of the inlet, and pairs of progressively shorter vanes arranged on both sides of the middle vane. Naturally, two middle vanes may be used, having lengths shorter than the inner diameter of the housing and being arranged on both sides of the diameter of the housing. Alternatively, the housing may be of any cross-section and the vane lengths will be determined by the distances between the inner surface of the housing to form a set of first vanes being substantially parallel.

A second vane array 5 is arranged adjacent the outlet 4. The second vane array has a plurality of strip-shaped second vanes 5' arranged inside the housing 2 and spaced apart with respect to a longitudinal axis of the housing, each individual vane of the plurality of second vanes being substantially parallel to other vanes of the second vane array and having a long edge 5" facing the inlet 3, a longitudinal axis of the first vanes being arranged at an angle to a longitudinal axis of the second vanes. Advantageously, the long edge facing the inlet is sharpened. More advantageously, also an opposite long edge 5''' is sharpened, to provide breaking up of material also if the flow of material changes direction, for example when back-flushing the system when cleaning a particularly big or difficult lump of material. Each second vane 5' is attached to the inside surface 2' of the housing at its ends, preferably by welding but any alternative technique which provides sufficient adhesion may be used, for example brazing or glueing. Each second vane thus has a length that allows it to run from one side of the inner surface of the housing to another side. In the case of a substantially circular housing (as is shown in the FIGS.), there is one second vane of preferably the same length as the inner diameter of the housing arranged in the middle of the inlet, and pairs of progressively shorter vanes arranged on both sides of the middle vane. Naturally, two middle vanes may be used, having lengths shorter than the inner diameter of the housing and being arranged on both sides of the diameter of the housing. Alternatively, the housing may be of any cross-section and the vane lengths will be determined by the distances between the inner surface of the housing to form a set of first vanes being substantially parallel.

The angle between first vanes 6' of the first vane array 6 and second vanes 5' of the second vane array is preferably between 5 and 90 degrees, most preferably 45 degrees. It has been found that having two arrays at an angle improves the breaking of lumps. In certain application it is foreseen to use only one array, if the lumping characteristics of the particulate material allows this. Likewise, in certain "heavy lumping" application, i.e. where there are numerous lumps formed in the particulate material, more than two arrays may be used, each array preferably at an angle to the other arrays. A further alternative, when dealing with severe lumping, is to use more than one pre-screening element arranged in series.

The plurality of first vanes 6' are advantageously arranged in a common plane generally perpendicular to the longitudinal axis of the housing 2. The plurality of second vanes 5' are similarly also advantageously arranged in a common plane generally perpendicular to the longitudinal axis of the housing. Alternatively, the vanes may be arranged to follow an imaginary curved surface (not shown), but this will add to the difficulty of manufacturing and thus probably increase the price of the product. Nevertheless, in applications requiring several vanes to, more or less, simultaneously contact a rounded lump of material, the "staggered" arrangement of vanes will be useful.

A pre-screening adapter 10 (as shown in FIG. 4), utilizing the pre-screening element 1 as described above, is attachable to a discharge coupling on a transport vehicle at one end of the adapter and to a discharge hose at the other end of the adapter. Alternatively, the adapter is attachable to the discharge hose at one end of the adapter and to an inlet coupling of a storage tank at the other end of the adapter. The adapter has a length of pipe 7, corresponding in dimension to the pipes or hoses used for the particular application, for example a flour transport truck. A male coupling 9 is attached at a first end 11 of the pipe, and a female coupling 8 is attached at a second end 12 of the pipe.

Figure 5:
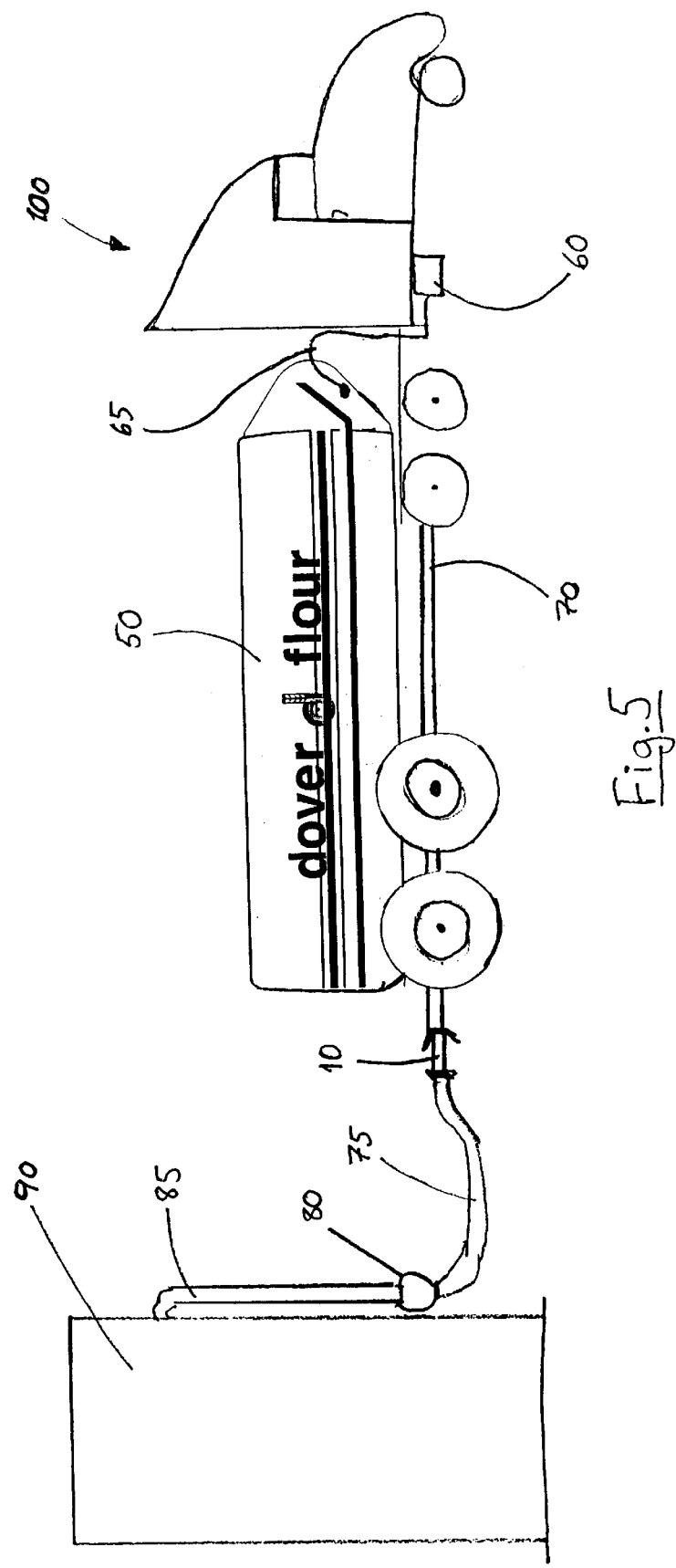
FIG. 5 is a schematic side view of a discharge system for handling powdered solids, having an adapter as described in FIG. 4.

A discharge system (as shown in FIG. 5) for handling powdered solids comprises a transport container 50, a pneumatic discharge system having a fan 60 connected to the container via a first duct 65 and a discharge duct 70 connected to the transport container and a pre-screening adapter 10 according to the invention. The fan is powered either via a power take-off on the vehicle, a dedicated internal combustion engine or by an electric motor (none of the alternatives shown in the FIGS.). The pressure built up in the transport tank is usually between 8 and 15 psi. The adapter is attached to an outlet of the discharge duct, and a second duct 75, a stationary duct associated with a storage container 90, is attached to the adapter at the other end of the adapter. A screen 80 is arranged in the second duct, and a third duct 85 conveys the material discharged from the transport container into the storage container. The fan thus pressurizes the transport container, which discharges material, preferably via a hopper (not shown) into the discharge duct, which normally is carried under the transport container. The discharged material is conveyed in the discharge duct to the pre-screening element of the adapter 10, after which it flows to the screen 80 via the second duct 75 and then the third duct 85 to the storage container 90. The transport container 50 is preferably mounted on a vehicle 100, such as a tractor.

It will be appreciated that the above description relates to the preferred embodiment by way of example only. Many variations on the invention will be obvious to those knowledgeable in the field, and such obvious variations are within the scope of the invention as described, whether or not expressly described.

What is claimed is:

1. A pre-screening element for use with pneumatic discharge systems for transport of powered material, said element comprising:

a housing having an inlet and an outlet;

a first vane array, having a plurality of strip-shaped first vanes arranged inside said housing and spaced apart with respect to a longitudinal axis of said housing, each individual vane of said plurality of first vanes being substantially parallel to other vanes of said first vane array and having a long edge facing said inlet;

a second vane array, having a plurality of strip-shaped second vanes arranged inside said housing and spaced apart with respect to a longitudinal axis of said housing, each individual vane of said plurality of second vanes being substantially parallel to other vanes of said second vane array and having a long edge facing said inlet, a longitudinal axis of said first vanes being arranged at a 45 degree angle to a longitudinal axis of said second vanes.

2. A pre-screening adapter for use with pneumatic discharge systems for transport of powdered material, said adapter comprising:

a length of pipe having a male coupling attached at a first end and a female coupling attached at a second end, a pre-screening element having a housing with an inlet and an outlet, a first vane array, having a plurality of strip-shaped first vanes arranged inside said housing and spaced apart with respect to a longitudinal axis of said housing, each individual vane of said plurality of first vanes being substantially parallel to other vanes of said first vane array and having a long edge facing said inlet, a second vane array, having a plurality of strip-shaped second vanes arranged inside said housing and spaced apart with respect to a longitudinal axis of said housing, each individual vane of said plurality of second vanes being substantially parallel to other vanes of said second vane array and having a long edge facing said inlet, a longitudinal axis of said first vanes being arranged at an angle to a longitudinal axis of said second vanes, said element arranged inside said pipe.

3. The pre-screening adapter as recited in claim 2, wherein said angle is between 5 and 90 degrees.

4. The pre-screening adapter as recited in claim 3, wherein said angle is 45 degrees.

5. The pre-screening adapter as recited in claim 3, wherein said housing is generally cylindrical.

6. The pre-screening adapter as recited in claim 3, wherein said plurality of first vanes are arranged in a common plane generally perpendicular to said longitudinal axis of said housing.

7. The pre-screening adapter as recited in claim 6, wherein said plurality of second vanes are arranged in a common plane generally perpendicular to said longitudinal axis of said housing.

8. A discharge system for handling powdered solids, said system comprising:

a transport container mounted on a vehicle;

a pneumatic discharge system having a fan connected to said container via a first duct and a discharge duct connected to said transport container for discharging material pressurized in said transport container by said fan;

a pre-screening adapter comprising a length of pipe having a male coupling attached at a first end and a female coupling attached at a second end, a pre-screening element having a housing with an inlet and an outlet, a first vane array, having a plurality of strip-shaped first vanes arranged inside said housing and spaced apart with respect to a longitudinal axis of said housing, each individual vane of said plurality of first vanes being substantially parallel to other vanes of said first vane array and having a long edge facing said inlet, a second vane array, having a plurality of strip-shaped second vanes arranged inside said housing and spaced apart with respect to a longitudinal axis of said housing, each individual vane of said plurality of second vanes being substantially parallel to other vanes of said second vane array and having a long edge facing said inlet, a longitudinal axis of said first vanes being arranged at an angle to a longitudinal axis of said second vanes, said element arranged inside said pipe.

* * * * *